(12) United States Patent
Momoi

(10) Patent No.: US 7,522,242 B2
(45) Date of Patent: Apr. 21, 2009

(54) LIQUID CRYSTAL DISPLAY DEVICE AND METHOD OF CONTROLLING VIEWING ANGLE THEREOF

(75) Inventor: Yuichi Momoi, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 297 days.

(21) Appl. No.: 11/507,026

(22) Filed: Aug. 21, 2006

(65) Prior Publication Data

US 2007/0040975 A1    Feb. 22, 2007

(30) Foreign Application Priority Data

Aug. 19, 2005   (JP) ............................. 2005-239030

(51) Int. Cl.
*G02F 1/1337* (2006.01)
(52) U.S. Cl. ............................. 349/129; 349/77; 349/78; 349/144; 349/193
(58) Field of Classification Search ................. 349/129, 349/77, 78, 79, 106, 108, 126, 127, 128, 349/144, 146, 193
See application file for complete search history.

(56) References Cited

U.S. PATENT DOCUMENTS

| | | | | |
|---|---|---|---|---|
| 6,614,498 | B1 * | 9/2003 | Tanaka et al. | 349/143 |
| 7,034,911 | B2 * | 4/2006 | Kato | 349/113 |
| 2003/0146893 | A1 * | 8/2003 | Sawabe | 345/89 |
| 2005/0068281 | A1 * | 3/2005 | Shin et al. | 345/88 |
| 2005/0140907 | A1 * | 6/2005 | Yun | 349/144 |
| 2007/0146610 | A1 * | 6/2007 | Momoi et al. | 349/144 |

FOREIGN PATENT DOCUMENTS

CN    1181517    5/1998

* cited by examiner

*Primary Examiner*—Brian M Healy
(74) *Attorney, Agent, or Firm*—McKenna Long & Aldridge LLP

(57) ABSTRACT

An LCD device includes: an LCD panel having at least one pixel that includes a first colored sub pixel and a white second sub pixel; and a liquid crystal alignment control means to control contrast in the LCD panel, wherein liquid crystal molecules of the second white sub pixel are aligned between 0° and 6° with respect to an absorption axis of at least one polarizing sheet by the liquid crystal alignment control means.

19 Claims, 13 Drawing Sheets different alignment directions in RGB and W pixels

FIG. 2
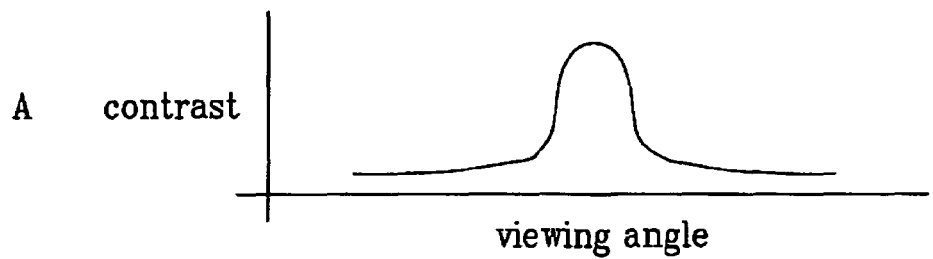
A
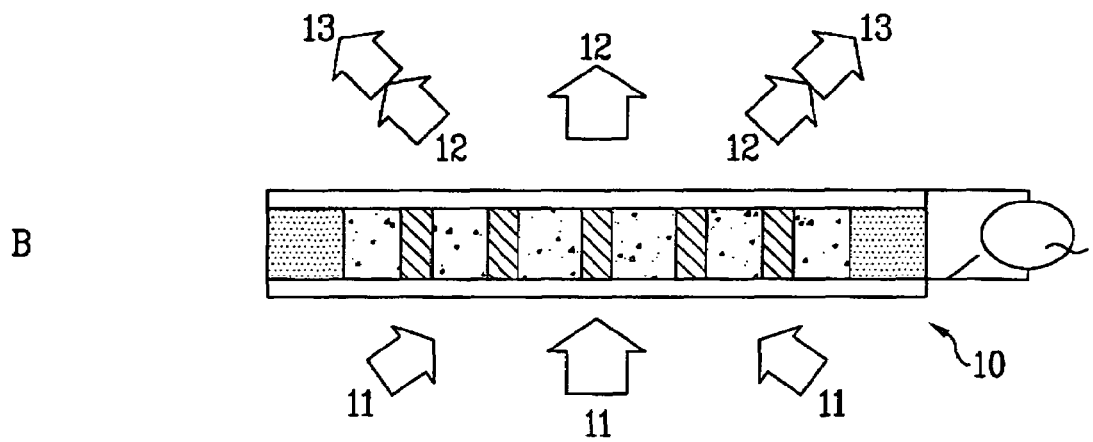
B
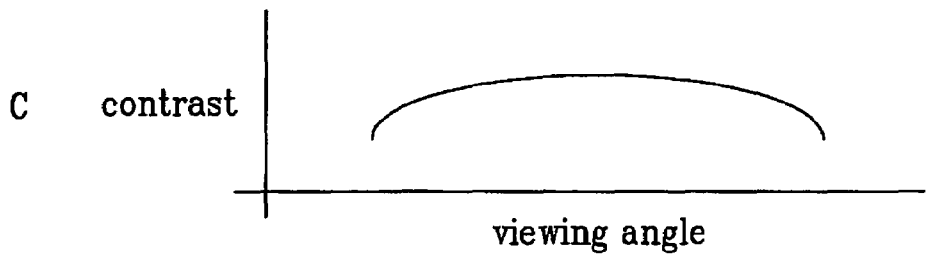
C
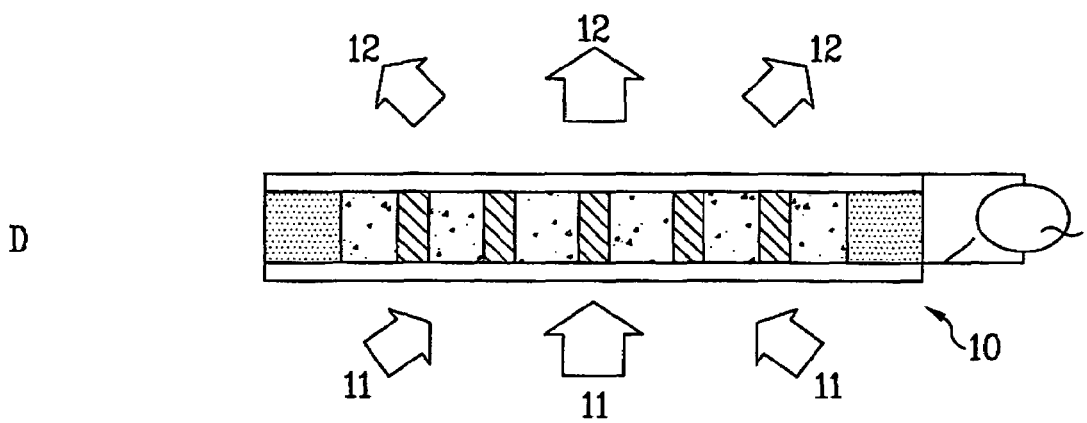
D arrangement of RGB and W pixels alignment liquid crystal molecules in VA mode different alignment directions in RGB and W pixels angle formed by polarizing axis and
liquid crystal molecule in W pixel aligned homogeneously

LIQUID CRYSTAL DISPLAY DEVICE AND METHOD OF CONTROLLING VIEWING ANGLE THEREOF

This application claims the benefit of the Japanese Patent Application No. 2005-239030, filed on Aug. 19, 2005, which is hereby incorporated by reference for all purposes as if fully set forth herein.

BACKGROUND OF THE INVENTION

1. Field of the Invention

The present invention relates to a liquid crystal display (LCD) device and a method for controlling a viewing angle thereof.

2. Discussion of the Related Art

Recently, LCD devices are widely used for word processors and personal computer displays in that the LCD device can be driven by a low voltage. The LCD device includes substrates treated with an alignment process, to thereby obtain a uniform picture image. In this respect, the LCD device has a directional variance, that is, the viewed image varies in accordance with the viewing direction.

For example, in the case of TN and STN mode LCD devices, the direction of light is controlled by using an alignment direction of long and thin liquid crystal molecules that has a problem of a narrow viewing angle.

To overcome this problem of directional variance in the LCD device, various proposals have been disclosed. For example, Japanese Laid Open Patent No. H9-19740 discloses an LCD device having a viewing angle control structure in which collimated light is incident on two liquid crystal display bonded to each other.

Hereinafter, a method for controlling a viewing angle in an LCD device according to the related art will be explained as follows.

FIGS. 1B and 1D are cross sectional views schematically illustrating an LCD device having two liquid crystal displays bonded to each other, on which collimated light is incident.

First, collimated light is incident on a first LCD panel 1. The first LCD panel 1 is identical in structure to a related art LCD panel that displays images.

Then, light from the first LCD panel 1 is incident on a second LCD panel 2, wherein the second LCD panel controls transmission and dispersion of the light. The transmission of light provides a narrow viewing angle mode, and the dispersion of light provides a wide viewing angle mode.

In this example, the first LCD panel is formed of a TN LCD panel, and the second LCD panel 2 is formed of polymer dispersion LCD panel.

Meanwhile, when using the high molecular dispersion LCD panel of the second LCD panel 2, as shown in FIG. 1D, liquid crystal molecules dispersed in a polymer are arranged randomly. Thus, the incident light is dispersed (6b, 6c) with the same luminance as that of surface transmitted light (6a).

In this case, a graph showing a relation between luminance and viewing angle is shown in FIG. 1C.

Meanwhile, as shown in FIG. 1B, when applying a voltage, the liquid crystal molecules dispersed in the polymer are arranged along an electric field, whereby the light is transmitted because the liquid crystal molecules are transparent.

In a narrow viewing angle mode a voltage is applied to the second LCD panel 2, and a graph for showing the relationship between luminance and viewing angle is shown in FIG. 1A. By controlling the luminance, it is possible to control the viewing angle.

In the related art, it is necessary to provide elements for collimating the light output from a fluorescent lamp and to perform additional processes for bonding the polymer dispersion LCD panel, thereby increasing a fabrication cost.

Next, Japanese Laid Open Patent No. 2004-325563 discloses an LCD device. In this case, in a vertical alignment mode, the viewing angle is controlled by changing an electrode structure. By dividing the electrode, an interval between openings is formed in-between the electrode where the liquid crystal is inclined. Also, luminance is controlled by changing the shape of electric line, to thereby change the viewing angle.

However, because the electrode structure is determined in the fabrication process, it is impossible to change the electrode structure after forming the LCD panel. Thus, several electrode shapes are compounded to thereby form pixels. Then, the pixel having the pattern with optimal viewing angle characteristics is selected, and the other pixels are not displayed, whereby the light efficiency deteriorates.

Related with the efficiency of controlling the viewing angle, as disclosed above, any effects are not made except that the maximum luminance is diverted in one direction.

SUMMARY OF THE INVENTION

Accordingly, the present invention is directed to a liquid crystal display (LCD) device and method of controlling viewing angle therefore that substantially obviates one or more problems due to limitations and disadvantages of the related art.

An advantage of the present invention is to provide an LCD device that can display a wide viewing angle and also can narrow the viewing angle by lowering contrast with leakage of light in a direction not viewed.

Additional features and advantages of the invention will be set forth in the description which follows and in part will become apparent from the description, or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, an LCD device including: an LCD panel having at least one pixel that includes a first colored sub pixel and a second white sub pixel, wherein liquid crystal molecules of the second white sub pixel are aligned differently from liquid crystal molecules of the first colored sub pixel.

In another aspect of the present invention, an LCD device includes an LCD device includes: an LCD panel having at least one pixel that includes a first colored sub pixel and a white second sub pixel; and a liquid crystal alignment control means to control contrast in the LCD panel, wherein liquid crystal molecules of the second white sub pixel are aligned between 0° and 6° with respect to an absorption axis of at least one polarizing sheet by the liquid crystal alignment control means.

In another aspect of the present invention, a method for controlling a viewing angle in an LCD device including: arranging a first sub colored pixel of a displaying element and a second white sub pixel within at least one pixel, wherein liquid crystal molecules of the second white sub pixel are aligned differently from liquid crystal molecules of the first sub pixel; and controlling the viewing angle by setting an electric field on/off state in the first sub pixel and the second sub pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 2 illustrates a state of the viewing angle in an LCD device according to the present invention;

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Hereinafter, an LCD device and a method for controlling a viewing angle thereof according to the present invention will be explained with reference to the accompanying drawings.

FIG. 2A illustrates a graph showing contrast versus viewing angle on a narrow viewing angle display mode, and FIG. 2B illustrates an LCD panel 10 wherein a viewing angle becomes smaller due to light from a W pixel.

FIG. 2A corresponds to FIG. 2B. In this case, a contrast peak of FIG. 2A corresponds to a central portion of the LCD panel for the light from RGB pixels in FIG. 2B. In FIG. 2B, an arrow 11 indicates incident light, and an arrow 13 indicates light passing through a W pixel. Due to the light passing through W pixel, the contrast at both sides of the LCD panel is lower than that in the central portion corresponding to the RGB pixels.

In the present invention, it is possible to control the viewing angle by controlling the contrast for viewing.

FIG. 2C is a graph showing the contrast and viewing angle in a wide viewing angle display mode.

FIG. 2D illustrates incident and output light of the LCD panel 10.

FIG. 2C corresponds to FIG. 2D. In this case, the light 12 output from the RGB pixel of the panel results in the wide viewing angle without forming the contrast peak of FIG. 2A.

In the present invention, a unit pixel includes at least four sub pixels, that is, a RGB pixel coated with three-color resist, and a W pixel (white or colored) having no resist.

Figure 1:
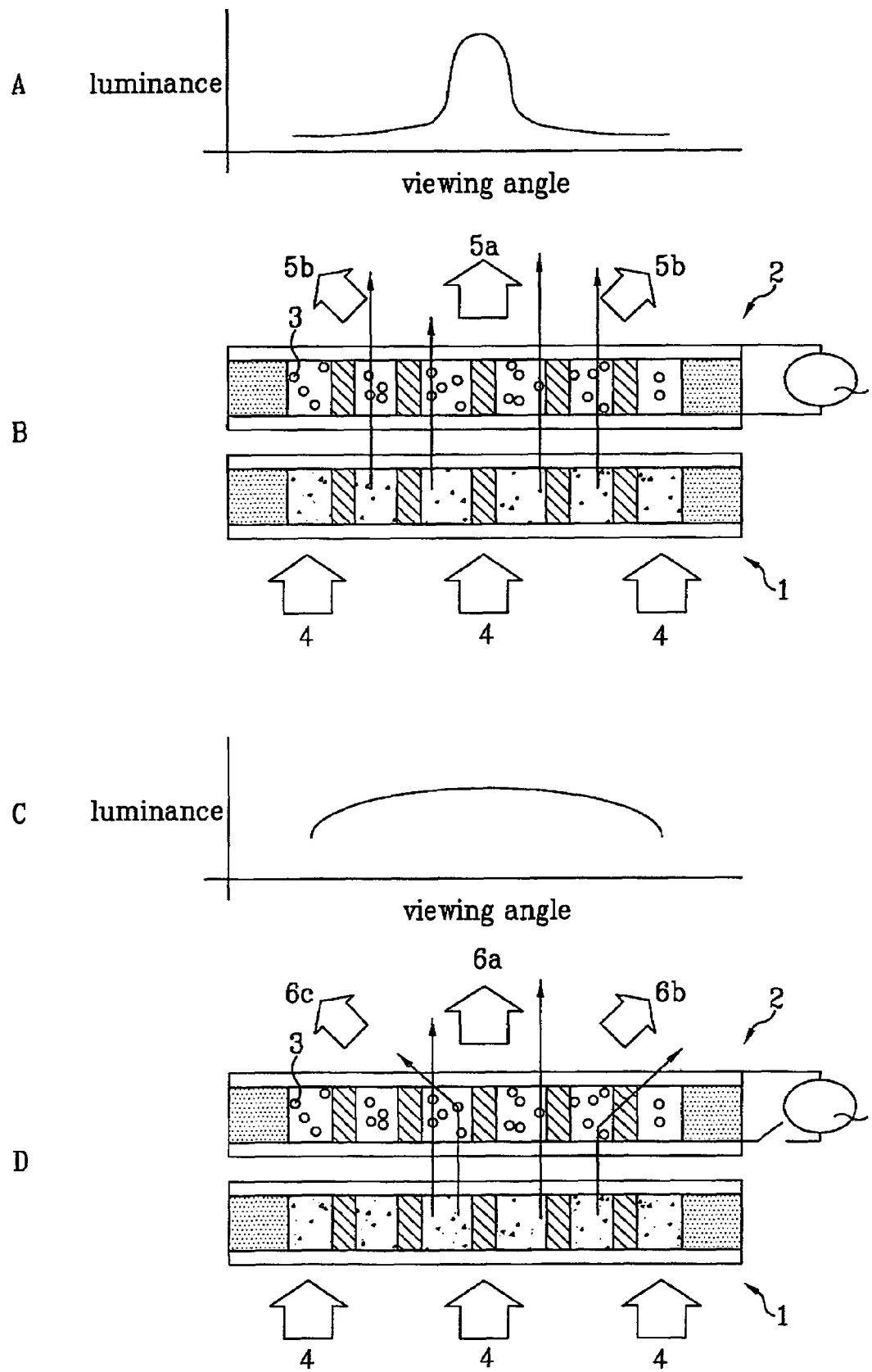
FIG. 1 illustrates a state of the viewing angle using a polymer dispersion LCD panel according to the related art.
Figure 3:
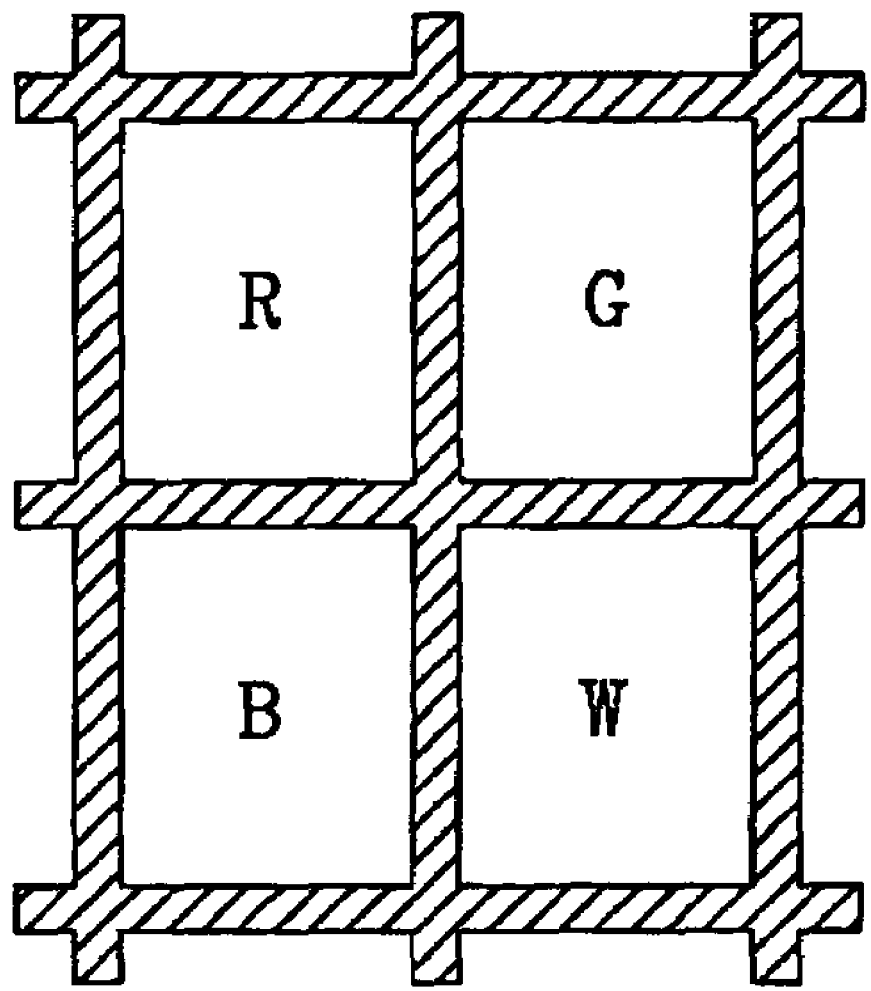
FIG. 3 illustrates an arrangement of RGB and W pixels.

For example, as shown in FIG. 3, the RGB and W pixels are arranged 2×2. However, it is not limited to this.

First Embodiment

Figure 4:
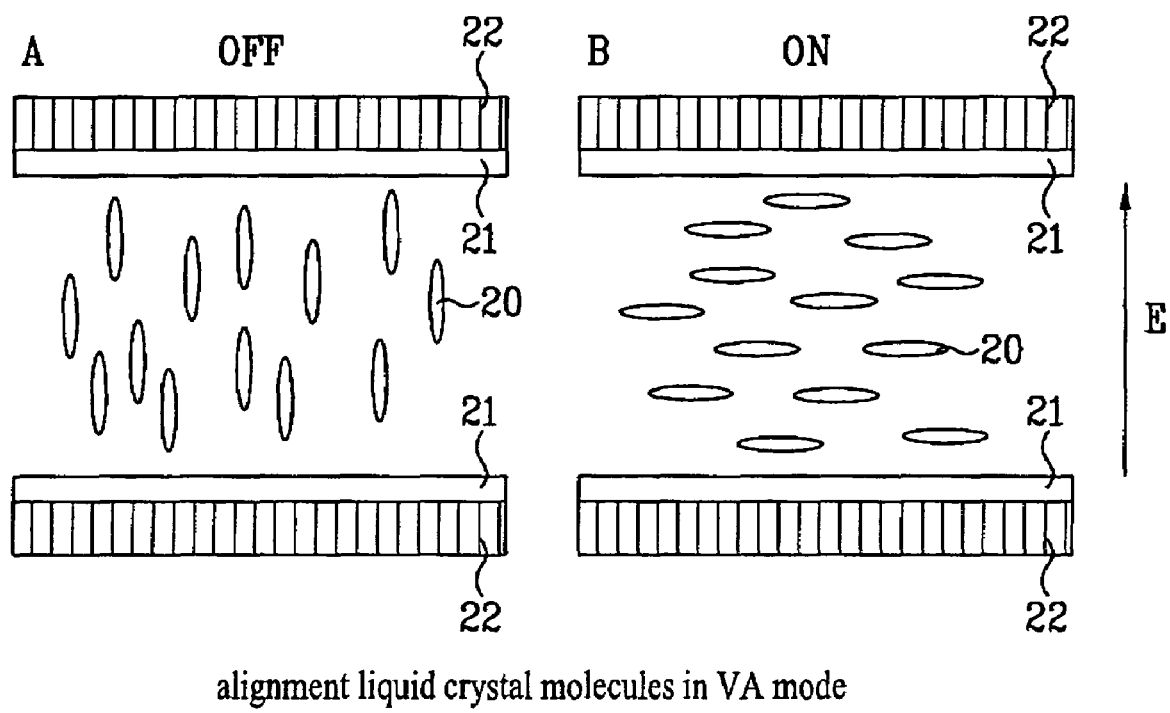
FIG. 4 illustrates a cross sectional view of the operation of liquid crystal molecules in a VA mode LCD device.

FIGS. 4A and 4B are cross sectional views showing operation of liquid crystal molecules in a vertical alignment (VA) mode.

In the first embodiment of the VA mode, as shown in FIG. 4A, the liquid crystal molecules 20 are vertical to a plane surface of a substrate because there is no electric field on a voltage off-state.

In this case, because a polarizing sheet 22 is adhered using crossed nicol, the polarized light passes through without retardation, to thereby produce a black state. Then, if applying the electric field (E) in the on-state, the liquid crystal molecules are horizontal (0°) to the plane surface of the substrate, as shown in FIG. 4B because the liquid crystal molecules have negative dielectric anisotropy, and the liquid crystal molecules of negative dielectric anisotropy are parallel to an electric field.

In the present invention, the liquid crystal molecules of the RGB pixel is different in alignment direction from liquid crystal molecules of the W pixel when the voltage is in the on-state, which will be explained as follows.

When the voltage is turned off/on in the RGB and W pixels, the alignment of liquid crystal molecules is shown in FIGS. 5A to 5D which illustrates one pixel.

Figure 5:
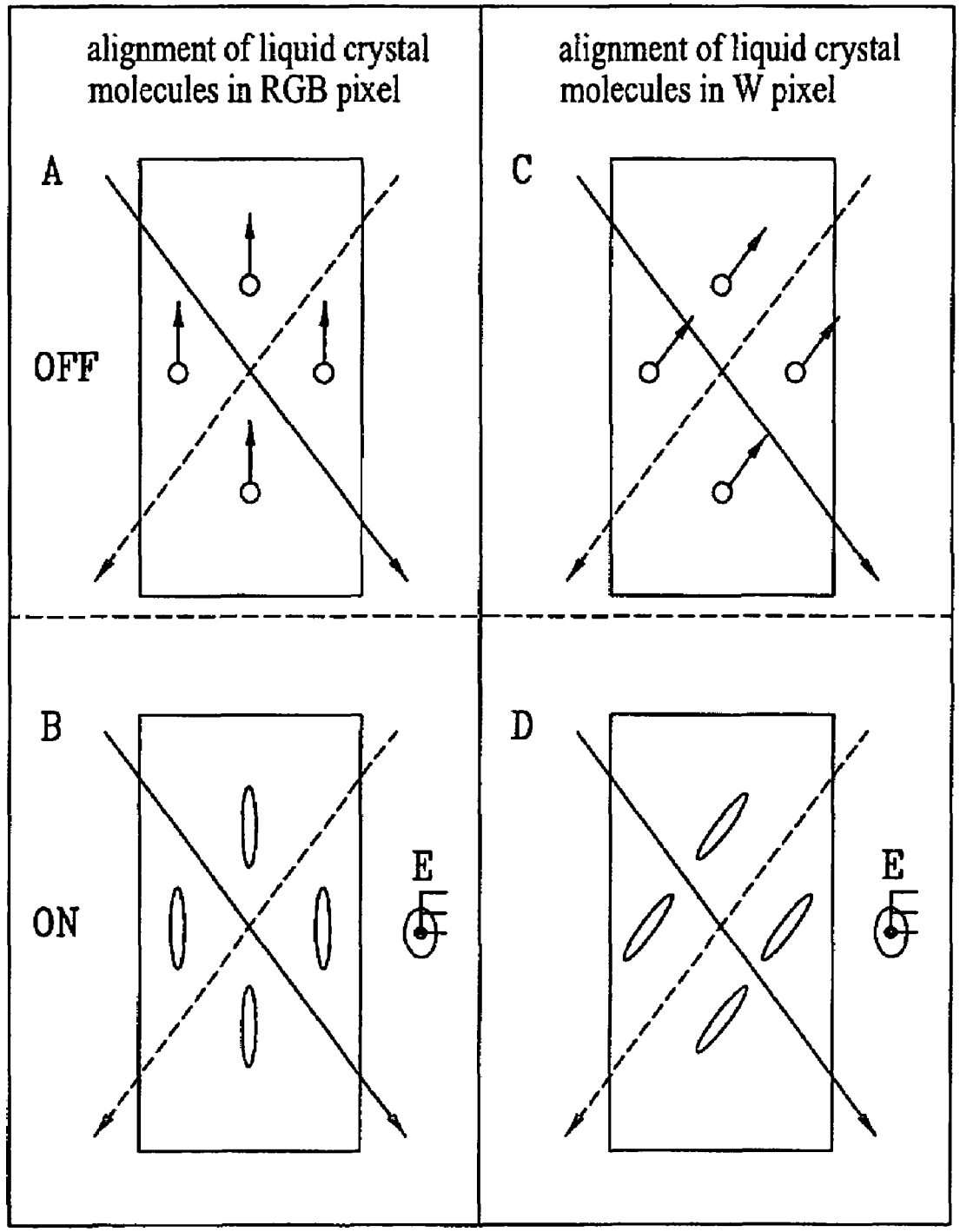
FIG. 5 illustrates a schematic top view wherein liquid crystal molecules in the RGB pixels are operated at a direction different from liquid crystal molecules of the W pixel in a VA mode LCD device.

FIGS. 5A and 5B illustrate the liquid crystal molecules in the RGB pixels, and FIGS. 5C and 5D illustrate the liquid crystal molecules in the W pixel. At this time, the arrow of the solid line and the arrow of the dotted line show the absorption axis of the polarizing sheet.

The RGB pixel will be explained with reference to FIGS. 5A and 5B. When the voltage is in the off-state (FIG. 5A), the liquid crystal molecules are shown with a shape of 'O' because it is in the VA mode. However, if the voltage is in the on-state (FIG. 5B), a structure or a slit is provided at 45° with regard to a polarizing axis of the polarizing sheet, to thereby align the liquid crystal molecules. Thus, the alignment of the liquid crystal molecules is arranged at a predetermined angle to the absorption axis of the polarizing sheet, whereby the incident polarized light is retarded, and the light leaks from the facing polarizing sheets, to thereby produce an image with a wide viewing angle.

The W pixel is explained with reference to FIGS. 5C and 5D. If the voltage is in the off-state (FIG. 5C), the liquid crystal molecules are shown with a shape of 'O' because it is in the VA mode. However, if the voltage is the on-state (FIG.

5D), the liquid crystal molecules are arranged in a vertical or horizontal direction relative to the absorption axis of the polarizing sheet. In a wide-viewing angle mode, if the W pixel is in the off-state, it is possible to produce the viewing angle characteristics corresponding to the related art VA mode panel using the RGB pixel.

In a narrow-viewing angle mode, the liquid crystal molecules are aligned in a horizontal or vertical direction relative to the absorption axis of the polarizing sheet by applying the electric field. For example, as shown in FIG. 5D, the light does not leak because the retardation is not generated in the polarized light incident along the arrow direction of dotted line. When viewing the panel in another direction (especially, the arrow direction of solid line), the retardation is generated in the incident polarized light, whereby the light leaks from the W pixel, thereby lowering the contrast.

If generating a problem in any direction, for example, in case of the voltage on-state, the liquid crystal molecules of the adjacent W pixel are aligned in parallel to the arrow direction of full line, or in vertical to the arrow direction of dotted line, to thereby remove the predetermined direction having no retardation (wherein the light is not leaked) in each of the two pixels. Accordingly, the light is leaked from all directions, so that it is possible to control the viewing angle. In case of the frontal side, the retardation is not generated in the W pixel of all directions, whereby the light is not leaked, thereby maintaining the contrast.

According to the present invention, it is unnecessary to provide new components or processes when bonding two LCD panels together, thereby decreasing the fabrication cost.

In addition, the alignment direction of the liquid crystal molecules of the W pixel is controllable based on the voltage. In this respect, it is possible to control the viewing angle by setting the size of the W pixel and the number of pixels W. Thus, the above control method may be adjustable by a user or panel designer.

Hereinafter, results from a simulation for controlling the viewing characteristics of the present invention will be explained as follows.

In the above simulation, each of lower and upper substrates is formed of a glass substrate having a thickness of 0.7 mm, an optical design corresponds to Δ=0.56, a liquid crystal that has a negative dielectric anisotropy (Δε=−4.1), and the polarizing axis of the polarizing sheet is defined with 45° and 135°.

The contrast is measured when applying a voltage of 3.3V. If applying the voltage, the RGB pixel include the liquid crystal molecules which are tilted at 90°, and the W pixel includes liquid crystal molecules that are tilted parallel to the polarizing axis of the lower and upper polarizing sheets (two directions of 45° and 135°).

Figure 6:
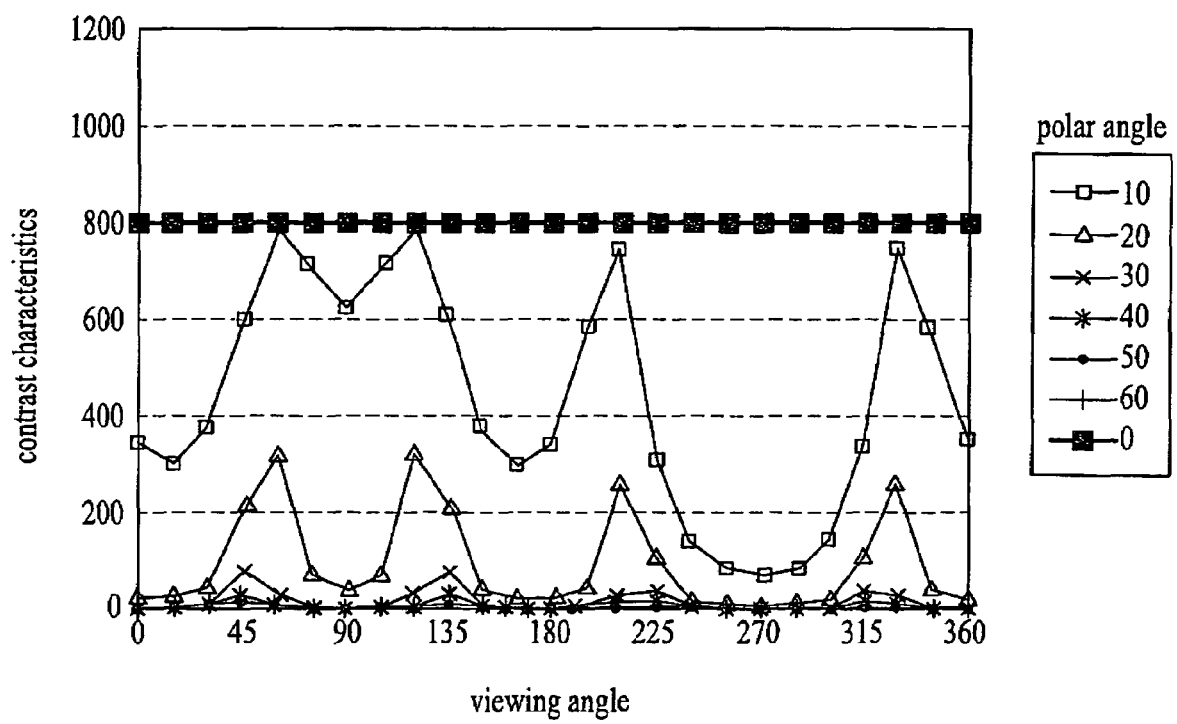
FIG. 6 illustrates the contrast characteristics for a viewing angle when RGB pixels are in an on-state and the W pixel is in an off-state.

FIG. 6 illustrates the contrast characteristics versus the viewing angle when RGB=3.3V and W=0V, that is, the RGB pixels are in the on-state and the W pixel is in the off-state.

Figure 7:
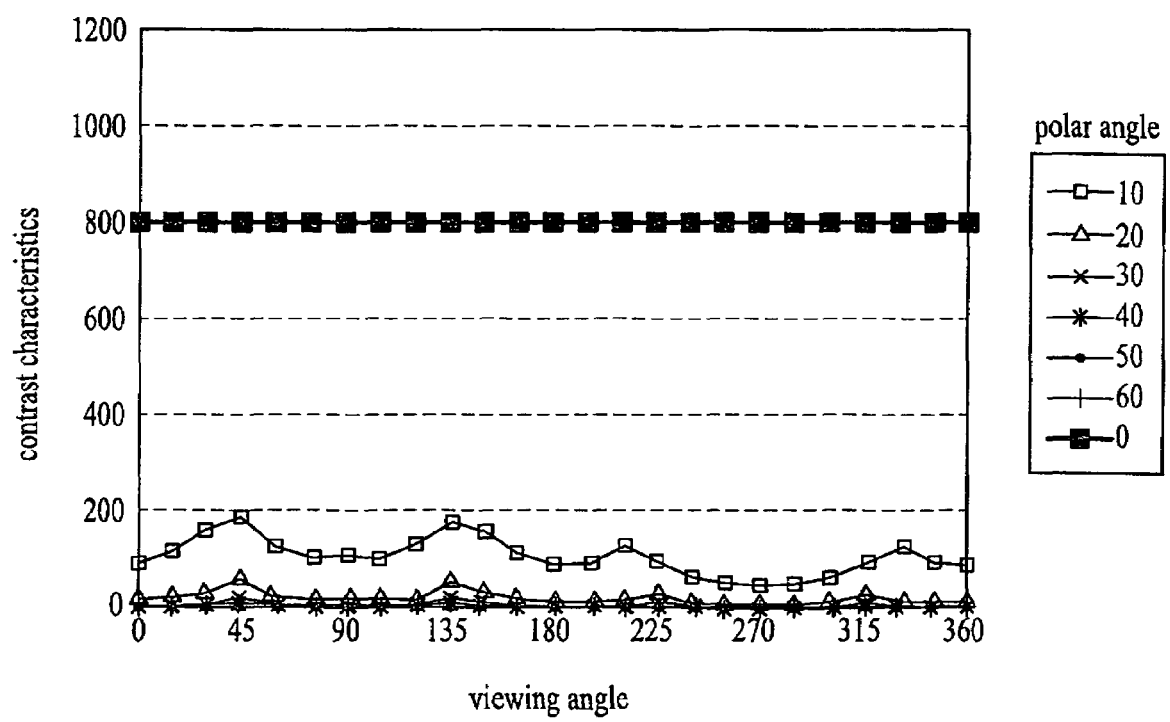
FIG. 7 illustrates the contrast characteristics for a viewing angle when a voltage applied to the RGB pixels is 3.3V and to the W pixel is 3.3V.

FIG. 7 illustrates the contrast characteristics versus the viewing angle when RGB=3.3V and W=3.3V, that is, the RGB and W pixels are in the on-state. In FIG. 7, the contrast characteristic is shown on the vertical axis, and the viewing angle is shown on the horizontal axis. Each curve of the graph shows the result for various polar angles of 0°, 10°, 20°, 30°, 40°, 50°, and 60°.

From the above result, a decrease in the frontal contrast is minimized by changing the on/off state of the W pixel, whereby the contrast versus the viewing angle of the direction of polar angle is largely decreased.

The present invention is advantageous in that controlling the optimal viewing angle may be precisely adjusted by optimizing the area of the W pixel when designing the LCD panel, and by controlling the voltage applied to the W pixel.

Figure 8:
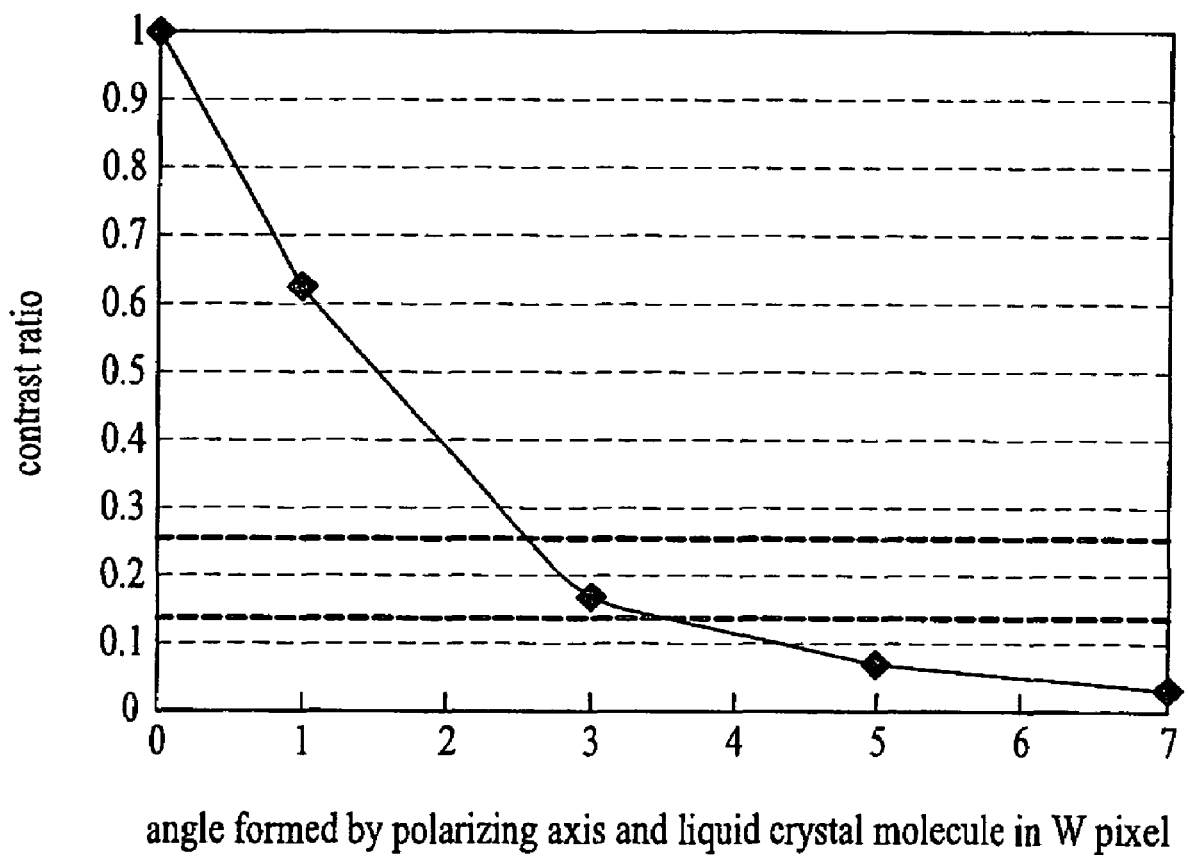
FIG. 8 illustrates the frontal contrast characteristics for an angle formed by a polarizing axis and liquid crystal molecule in a W pixel when the W pixel is in an on-state.

FIG. 8 illustrates the frontal contrast characteristic versus the angle formed by the polarizing axis and the liquid crystal molecule in the W pixel when applying 3.3V to the W pixel. In FIG. 8, the contrast ratio is shown on the vertical axis, and the angle of liquid crystal molecule versus the polarizing axis is shown on the horizontal axis. If the angle is 0° between the polarizing axis and the alignment direction of liquid crystal molecules, that is, the liquid crystal molecules are parallel to the polarizing axis, the contrast is 1. Meanwhile, as the angle varies between 1° and 7°, the contrast decreases.

In the present invention, when applying the voltage to the W pixel, it is possible to improve the efficiency of the process where the alignment direction of liquid crystal molecules is parallel to the polarizing axis. However, as shown in FIG. 8, when the angle is greater than 0°, it tends to lower the frontal contrast.

Referring to FIG. 7, because the frontal contrast is 800, when the polar angle is 10° the contrast is between 100 and 200, preferably, the angle between the polarizing axis and the tilted direction of liquid crystal molecules is about 3°, to thereby maintain the contrast of 100.

Further, it is more preferable to maintain the angle between the polarizing axis and the alignment direction of liquid crystal molecules in the W pixel within the range of about 0° to 3°.

The above display device according to the present invention uses the RGB pixel. However, it is not limited to this. The display device of the present invention may use other-colored pixels as display elements.

The display device according to the preferred embodiment of the present invention is formed of a TN mode. In case of the TN mode, liquid crystal molecules of the RGB pixel are aligned differently versus the liquid crystal molecules of the W pixel, which will be explained as follows.

When the voltage is turned off/on in the RGB and W pixels, the alignment of liquid crystal molecules is shown in FIGS. 9A to 9D which illustrates one pixel.

FIGS. 9A and 9B illustrate the liquid crystal molecules in the RGB pixel, and FIGS. 9C and 9D illustrate the liquid crystal molecules in the W pixel. FIGS. 9A to 9D illustrate the alignment direction of liquid crystal molecules when the electric field (E) is in the on/off state. At this time, the arrow of the solid line and the arrow of dotted line show the direction of the absorption axis of the polarizing sheet.

The RGB pixel will be explained with reference to FIGS. 9A and 9B. When the voltage is in the on-state (FIG. 9A), the liquid crystal molecules are shown in a shape of '○'. However, if the voltage is in the off-state (FIG. 9B), the liquid crystal molecules are aligned according to the absorption axis (rubbing direction) of the polarizing sheet. As shown in FIG. 9B, when the electric field is in the off-state, the liquid crystal molecules in the RGB pixel of the TN mode are twisted by 90°, to thereby obtain a normally white state. If the electric field is in the on-state, as shown in FIG. 9A, the liquid crystal molecules in the RGB pixel are aligned based on the direction of the electric field.

FIGS. 9C and 9D illustrate the alignment direction of the liquid crystal molecules in the W pixel. If the electric field is in the off-state, the liquid crystal molecules are not twisted because the rubbing direction is homogeneously aligned in parallel. If the electric field is in the on-state, the liquid crystal molecules are aligned based on the direction of electric field (FIG. 9C).

When the W pixel is off in a general mode, it is possible to obtain the viewing angle characteristics that corresponds to that of a related art TN mode LCD panel due to the RGB pixel.

Figure 9:
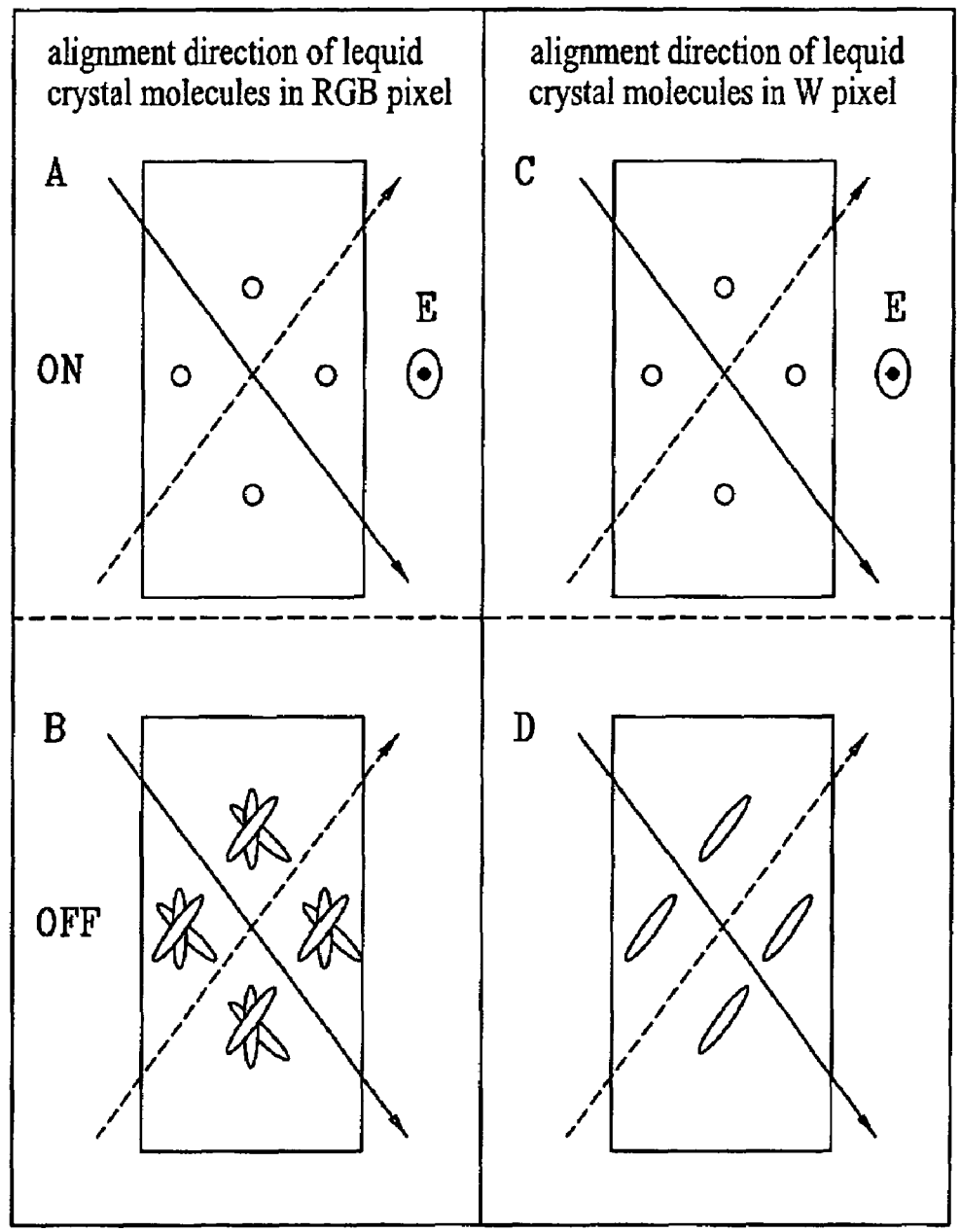
FIG. 9 illustrates a schematic top view showing a RGB pixel and a W pixel having different operation directions in a TN mode LCD device.

In a narrow-viewing angle mode, the liquid crystal molecules are aligned along the electric field of the W pixel in the on-state. For example, as shown in FIG. 9, when the viewing angle is along the direction of the dotted line, the incident polarized light is not retarded, whereby the light is not leaked. For other viewing angles (especially, the direction of the solid line), the incident polarized light is retarded, whereby the light leaks from the W pixel, thereby lowering the contrast.

If generating a problem in any direction, for example, when the electric field is in the off-state, the liquid crystal molecules of the adjacent W pixel are aligned in parallel to the solid line or vertical to the dotted line, to thereby minimize the predetermined portion having no retardation (wherein the light is not leaked) in each of the two pixels. Thus, the light leaks in all directions, so that it is possible to control the viewing angle. Directly in front of the panel, the retardation is not generated in the W pixel in all directions, whereby the light does not leak, thereby maintaining the contrast.

A method for fabricating an LCD panel of the present invention may use a related art method. In the TN mode discussed in the embodiment of the present invention above, the liquid crystal molecules of the RGB pixel are twisted by 90° (FIG. 9B), and the liquid crystal molecules of the W pixel are twisted by 0° (homogeneous, FIG. 9D).

The rubbing direction in the RGB and W pixels on any one of color filter and TFT substrates is changed by 90° (the solid line in FIGS. 9E and 9F).

As shown in FIG. 9E, the rubbing process for the RGB pixel is performed in a crossed direction on the color filter and TFT substrates. Meanwhile, as shown in FIG. 9F, the rubbing process for the W pixel is performed in a parallel direction on the color filter and TFT substrates.

By using the rubbing technology currently and generally available, the alignment direction is identical in each pixel. Accordingly, it is necessary to identify the technology for obtaining the different alignment directions in the RGB pixel and the W pixel. For example, the Japanese Laid Open Patent No. 2001-166309 discloses such alignment technology, which will be explained as follows.

Figure 13:
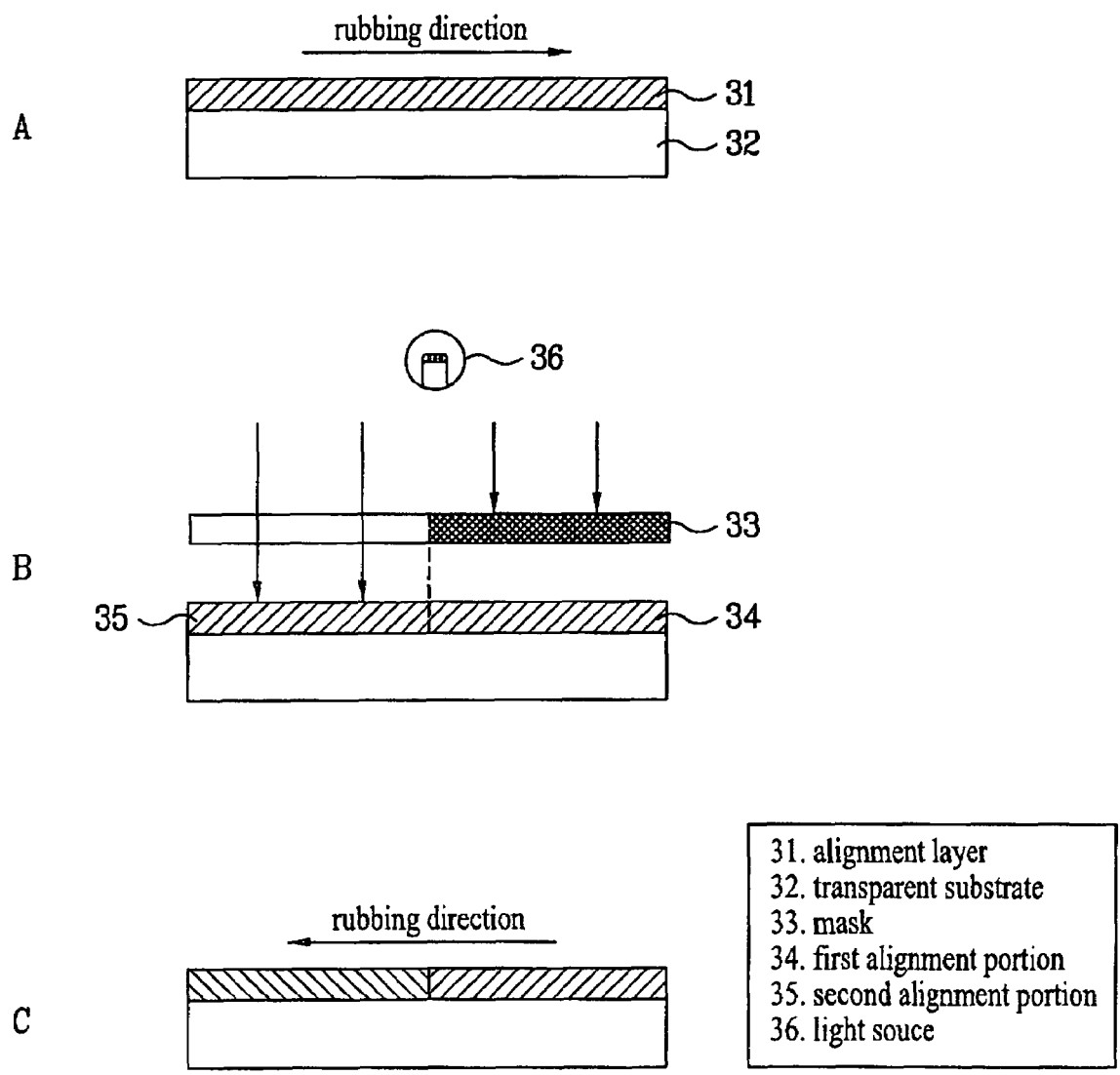
FIG. 13 illustrates a schematic view for explaining a division alignment technology of a related art LCD device.

FIG. 13 illustrates a schematic view which shows a method for fabricating an LCD device using the above alignment technology. In FIG. 13, a reference number 31 corresponds to an alignment layer on which liquid crystal molecules are aligned; a reference number 32 corresponds to a transparent substrate; a reference number 33 corresponds to a mask; a reference number 34 corresponds to a first alignment portion on which light is not applied; a reference number 35 corresponds to a second alignment portion on which light is applied; and a reference number 36 corresponds to a light source.

Hereinafter, the alignment division technology will be described with reference to FIG. 13.

As shown in FIG. 13A, a first rubbing process is performed to the alignment layer 31 formed on the transparent substrate 32. Then, as shown in FIG. 13B, the light source 36 such as Deep-UV, UV or He—Ne laser is applied to the alignment layer 31 through the mask 33, to thereby form the first alignment portion 34 on which light is not applied, and the second alignment portion 35 on which light is applied.

At this time, the first alignment portion 34 maintains a pretilt angle of the first rubbing process since the light is not applied to the first alignment portion 34. However, for the second alignment portion 35 on which light is applied, a pretilt angle is changed due to disjointing, polymerization, or isomerization in molecular chains of the alignment layer 31.

As shown in FIG. 13C, a second rubbing process, which has a slightly weaker intensity than the first rubbing process, is performed to the alignment layer 31, wherein the second rubbing process is different in rubbing direction from the first rubbing process. When performing the second rubbing process, which has different rubbing conditions from the first rubbing process, to the first and second alignment portions 34 and 35 having the different pritilt angles, the first alignment portion 34 has a different pretilt angle from the pretilt angle in the second alignment portion 35, to thereby result in different alignments in the two sections.

The simulation result for the control of viewing characteristics in the above embodiment of the present invention is shown as follows. These simulation conditions are identical those of the first embodiment of the present invention except that the liquid crystal has a positive dielectric anisotropy.

Figure 10:
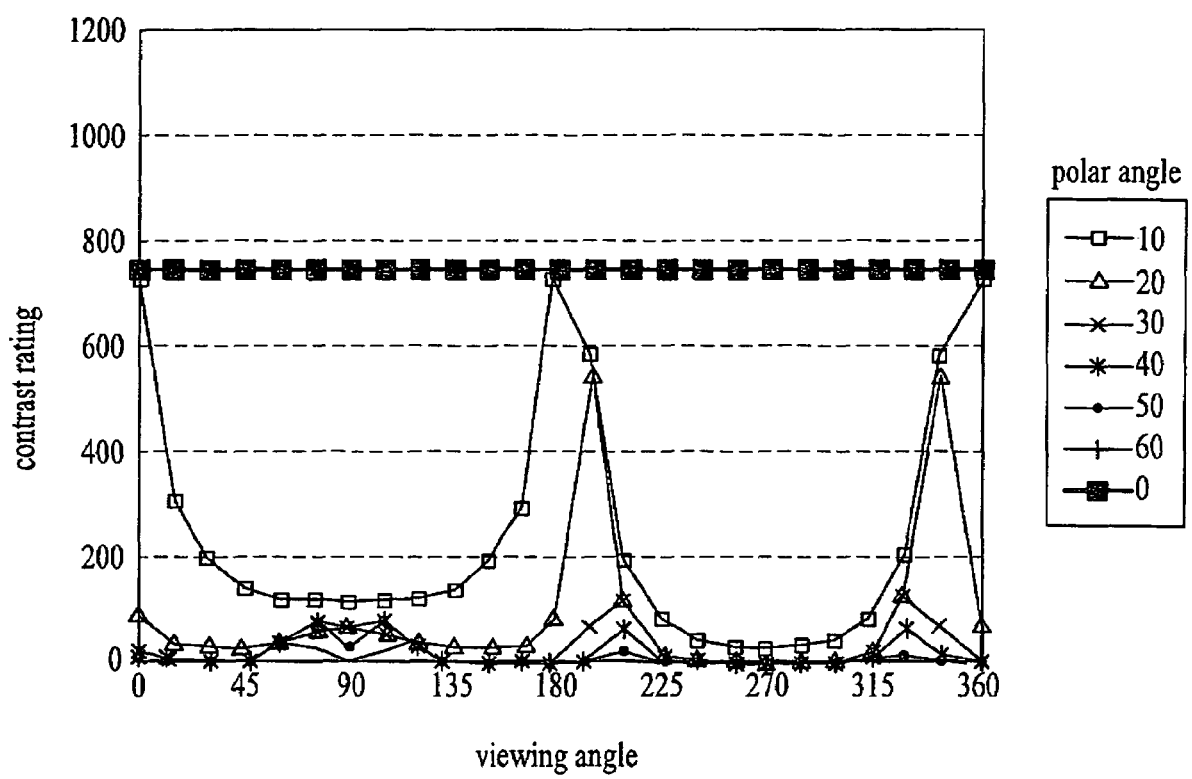
FIG. 10 illustrates the contrast characteristics for a viewing angle when the RGB pixel is in the electric field off-state and the W pixel is in an on-state.

FIG. 10 illustrates the contrast characteristics versus the viewing angle when the electric field is applied only to the RGB pixel.

Figure 11:
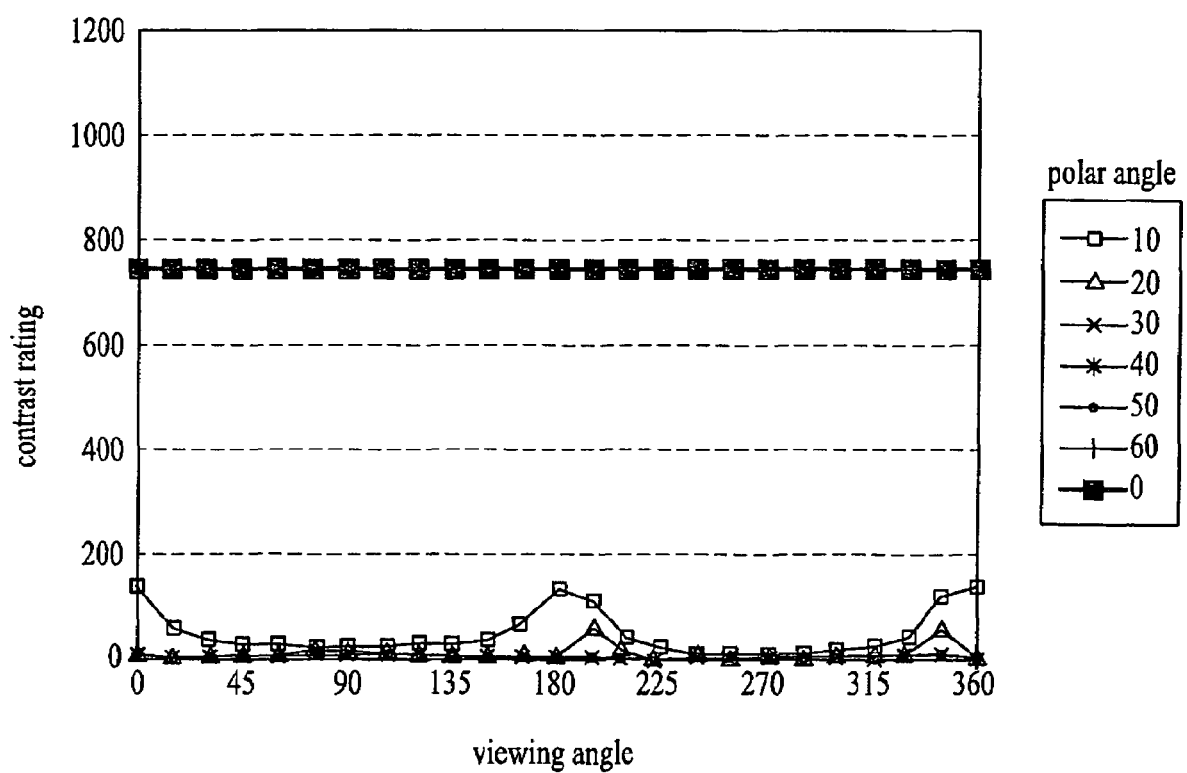
FIG. 11 illustrates the contrast characteristics for a viewing angle when the RGB pixel is in the off-state, and the W pixel is in the electric field off-state.

FIG. 11 illustrates the contrast characteristics versus the viewing angle which divides the two W pixels having no retardation (light does not leak) when applying the electric field to the RGB and W pixels.

As a result, the contrast at a polar angle of 0° is maintained, however, the contrast sharply decreases within the range of polar angle between 10° and 30°. That is, the frontal light does not leak in the W pixel. However, if the polar angle is out of the above range, the light leaks, whereby the contrast is lowered.

Accordingly, by changing the on/off state in the W pixel, it is possible to minimize the decrease in frontal contrast. In this case, the contrast versus the viewing angle in the direction of the polar angle largely decreases.

As explained above, the viewing angle control technology of the present invention has advantageous characteristics. Especially, it is unnecessary to provide new components or to bond the LCD panel, thereby decreasing a fabrication cost.

Further, when designing the LCD panel, it is possible to optimize the size of W pixel and to electrically adjust the intensity for controlling the viewing angle because the W pixel controls the alignment of liquid crystal molecules in accordance with the voltage. Thus, the present invention is advantageous in that the viewing angle is controllable by a user or panel designer.

Figure 12:
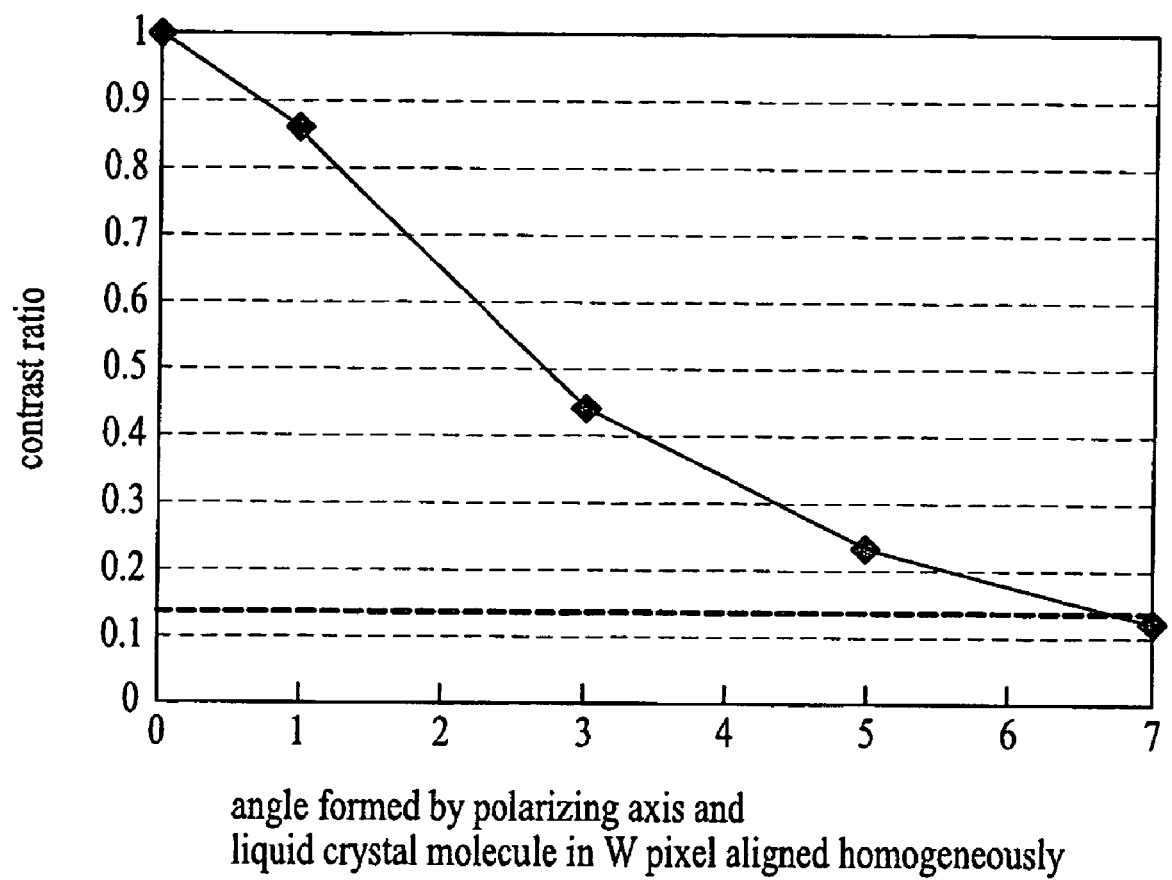
FIG. 12 illustrates the frontal contrast characteristics for an angle formed by polarizing axis and liquid crystal molecules in the W pixel having liquid crystal molecules aligned homogeneously.

FIG. 12 illustrates the frontal contrast characteristic versus the angle formed by the polarizing axis and the liquid crystal molecule in the W pixel aligned homogeneously. In FIG. 12, the contrast ratio is shown on the vertical axis, and the angle of liquid crystal molecule for the polarizing axis is shown on the horizontal axis. If the angle is 0° between the polarizing axis and the alignment direction of liquid crystal molecules, that is, the liquid crystal molecules are parallel to the polarizing axis, the contrast is 1. Meanwhile, as the angle varies between 1° and 7°, the contrast characteristics decrease.

If the W pixel is in the off-voltage state, it is possible to improve the efficiency of the process where the tilt direction of liquid crystal molecules is parallel to the polarizing axis. However, as shown in FIG. 12, if the angle is greater than 0° (parallel), it tends to lower the frontal contrast. According to this Figure, to reduce the contrast from 700 to 100 ($\frac{1}{7}$=0.015), it is necessary to make the angle between the polarizing axis and the tilted direction of liquid crystal molecules in the W pixel below 6°. Further, it is desirable to maintain the angle between the polarizing axis and the tilt direction of liquid crystal molecules in the W pixel within the range of 0° to 6°.

In the preferred embodiment of the present invention, both the RGB and W pixels use a TN mode. However, the RGB pixel may use the TN mode, and the W pixel may use the VA mode. Also, the RGB pixel may use a the VA mode, and the W pixel may use the TN mode.

The display device of the present invention uses the RGB pixel. However, the display device of the present invention may use other-colored pixels instead of the RGB pixel.

In the present invention, it is possible to lower the contrast by controlling the light in the W pixel, and to control the viewing angle by displaying other images that are different from original images or information.

As mentioned above, the present invention has the following advantages.

In the present invention, it is unnecessary to provide collimated light, and to provide two bonded LCD panels. That is, the present invention may be provided with one LCD panel and may be operated with a related art backlight, to thereby decrease the fabrication cost, and to improve the yield.

In addition, the intensity to precisely adjust the optional viewing angle may be controlled with the voltage applied to the pixel in accordance with the desire of user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
an LCD panel having at least one pixel that includes a first colored sub pixel and a second white sub pixel,
wherein liquid crystal molecules of the second white sub pixel are aligned differently from liquid crystal molecules of the first colored sub pixel,
wherein the first colored sub pixel has liquid crystal molecules vertically aligned in the voltage off-state and aligned in other directions except a direction substantially parallel to an absorption axis of at least one polarizing sheet in the voltage on-state, and the second white sub pixel has liquid crystal molecules vertical in the voltage off-state and aligned between about 0° and 3° with respect to the absorption axis of the polarizing sheet in the voltage on-state, if the LCD panel is a VA mode, or
wherein the first colored sub pixel has liquid crystal molecules aligned in accordance with an electric field in the voltage on-state and twisted according to a polarizing sheet in the voltage off-state, and the second white sub pixel has liquid crystal molecules aligned in accordance with the electric field and aligned between 0° and 6° with respect to the absorption axis of the polarizing sheet in the voltage on-state and homogeneously aligned in the voltage off-state, if the LCD panel is a TN mode.

2. The LCD device of claim 1, wherein the second white sub pixel is one of a homogeneous alignment type and a vertical alignment type.

3. The LCD device of claim 1, wherein the first colored sub pixel is formed of each of RGB pixels or other-colored pixels, and a remaining portion of the first sub pixel is formed of white or colored sub pixels.

4. An LCD device comprising:
an LCD panel having at least one pixel that includes a first colored sub pixel and a white second sub pixel; and
a liquid crystal alignment control means to control contrast in the LCD panel,
wherein liquid crystal molecules of the second white sub pixel are aligned between 0° and 6° with respect to an absorption axis of at least one polarizing sheet by the liquid crystal alignment control means, and
wherein liquid crystal molecules of the second white sub pixel are aligned differently from liquid crystal molecules of the first colored sub pixel.

5. The LCD device of claim 4, wherein the LCD device is formed in a VA mode, and the second white sub pixel is one of a homogeneous alignment type and a vertical alignment type.

6. The LCD device of claim 4, wherein the LCD device is formed in a TN mode, and the second white sub pixel is one of a homogeneous alignment type and a vertical alignment type.

7. The LCD device of claim 5, wherein the first colored sub pixel has the liquid crystal molecules vertically aligned in the voltage off-state, and aligned to the other directions except a direction substantially parallel to an absorption axis of at least one polarizing sheet in the voltage on-state, and
the second white sub pixel has the liquid crystal molecules vertically in the voltage off-state and aligned between about 0° and 3° with respect to the absorption axis of the polarizing sheet in the voltage on-state.

8. The LCD device of claim 6, wherein the first colored sub pixel has liquid crystal molecules aligned in accordance with an electric field in the voltage on-state and twisted according to a polarizing sheet in the voltage off-state, and
the second white sub pixel has the liquid crystal molecules aligned in accordance with the electric field and aligned between 0° and 6° with respect to the absorption axis of the polarizing sheet in the voltage on-state, and being homogeneously aligned in the voltage off-state.

9. The LCD device of claim 4, wherein the first colored sub pixel is formed of each of RGB pixels or other-colored pixels, and a remaining portion of the first sub pixel is formed of white or colored sub pixels.

10. The LCD device of claim 4, wherein liquid crystal molecules of the second white sub pixel are aligned between 0° and 3° with respect to an absorption axis of at least one polarizing sheet by the liquid crystal alignment control means.

11. A method for controlling a viewing angle in an LCD device comprising:
arranging a first sub colored pixel of a displaying element and a second white sub pixel within at least one pixel, wherein liquid crystal molecules of the second white sub pixel are aligned differently from liquid crystal molecules of the first sub pixel; and
controlling the viewing angle by setting an electric field on/off state in the second sub pixel.

12. The method of claim 11, wherein the LCD device is formed in a VA mode, and the second white sub pixel is one of a homogeneous alignment type and a vertical alignment type.

13. The method of claim 11, wherein the LCD device is formed in a TN mode, and the second white sub pixel is one of a homogeneous alignment type and a vertical alignment type.

14. The method of claim 12, wherein the first colored sub pixel has liquid crystal molecules vertically aligned in the voltage off-state and aligned in other directions except a direction substantially parallel to an absorption axis of at least one polarizing sheet in the voltage on-state, and
the second white sub pixel has the liquid crystal molecules vertical in the voltage off-state and aligned between 0° and 3° with respect to the absorption axis of the polarizing sheet in the voltage on-state.

15. The method of claim 13, wherein the first colored sub pixel has the liquid crystal molecules aligned in accordance with an electric field in the voltage on-state and twisted according to a polarizing sheet in the voltage off-state, and the second sub pixel has the liquid crystal molecules aligned in accordance with the electric field and aligned between 0° and 6° with respect to the absorption axis of the polarizing sheet in the voltage on-state and homogeneously aligned in the voltage off-state.

16. The method of claim 11, wherein the first colored sub pixel is formed of each of RGB pixels or other-colored pixels, and remaining portions of the first sub pixel are formed of white or colored sub pixels.

17. The LCD device of claim 1, wherein liquid crystal molecules of the first colored sub pixel are aligned about 45° with the respect to an absorption axis of at least one polarizing sheet in a voltage on-state, and liquid crystal molecules of the second white sub pixel are aligned substantially parallel or perpendicular with the respect to an absorption axis of at least one polarizing sheet in the voltage on-state.

18. The LCD device of claim 5, wherein liquid crystal molecules of the first colored sub pixel are aligned about 45° with the respect to an absorption axis of at least one polarizing sheet in a voltage on-state, and liquid crystal molecules of the second white sub pixel are aligned substantially parallel or perpendicular with the respect to an absorption axis of at least one polarizing sheet in the voltage on-state.

19. The method of claim 12, wherein liquid crystal molecules of the first colored sub pixel are aligned about 45° with the respect to an absorption axis of at least one polarizing sheet in a voltage on-state, and liquid crystal molecules of the second white sub pixel are aligned substantially parallel or perpendicular with the respect to an absorption axis of at least one polarizing sheet in the voltage on-state.

* * * * *